INVENTOR
ALBERT E. SANDERSON
BY
Blair Buckles Cesari & St.Onge
ATTORNEYS

INVENTOR
ALBERT E. SANDERSON
BY
*Blair Buckles Cesari & St.Onge*
ATTORNEYS

INVENTOR
ALBERT E. SANDERSON
BY

Blair Buckles Cesari & St.Onge
ATTORNEYS

United States Patent Office 3,522,526
Patented Aug. 4, 1970

3,522,526
MULTIPORT RADIO FREQUENCY MEASURING AND COUPLING CIRCUITS HAVING MATCHED INPUT IMPEDANCE AT UNKNOWN PORT
Albert E. Sanderson, Forest Park Drive, Carlisle, Mass. 01741
Filed Mar. 17, 1967, Ser. No. 623,851
Int. Cl. G01r *27/04;* H01p *5/12*
U.S. Cl. 324—58                                31 Claims

ABSTRACT OF THE DISCLOSURE

It is herein disclosed that radio frequency multiport circuits that meet two requirements: (1) null output with a matched unknown-port termination and (2) matched unknown-port input impedance with essentially any design impedances at source and detector ports, operate as unusually low-error measuring circuits of complex reflection coefficients. In some arrangements, the error is theoretically zero. The circuits are also useful as couplers.

Also disclosed is a four-arm transmission line bridge circuit having resistive inner conductors and which satisfies the two conditions. It operates with a balanced input signal. Alternatively, it can be coupled with a balun for operation with an unbalanced source. A circulator circuit in which a nonreciprocal circulator is fitted with two tuners also meets the two conditions.

BACKGROUND

This invention relates to electrical measuring and coupling circuits particularly suited for use at radio frequencies. The term "radio frequency" is used herein in a broad sense to include microwave frequencies.

One embodiment of the invention is a new transmission-line bridge circuit that produces a signal identifying with relatively high accuracy the difference between two complex reflection coefficients; it also operates as a coupler. The operation of the bridge circuit has minimal dependence on frequency.

Another new circuit embodying the invention employs a nonreciprocal circulator and is capable of producing an unusually high-level signal accurately corresponding to the phase and magnitude of an unknown reflection coefficient.

Prior radio frequency circuits for producing signals corresponding in phase and magnitude to a complex reflection coefficient, such as those described in U.S. Pat. Nos. 2,769,146; 2,950,449; and 2,976,497; generally provide optimum operation at essentially a single frequency. Hence, they generally are useful only over a limited frequency range determined by the error that can be tolerated. Operation over wider ranges generally requires several such circuits designed for different frequency bands within the desired range. This is costly and inconvenient.

Further, the accuracy of many prior impedance-measuring circuits deteriorates markedly when they are not closely matched to the source and output device.

It is an object of the present invention to provide improved equipment for measuring complex reflection coefficients. In particular, it is an object to provide a reflection coefficient measuring circuit whose operation has essentially no dependence on the operating frequency. It is a further object to provide such a circuit having comparatively accurate operation. The circuit should also be relatively easy to construct. Another object of the invention is to provide such a circuit that produces a reflection coefficient-identifying output signal of comparatively large magnitude. It is also an object that the circuit have comparatively low sensitivity to mismatches to the source and/or output device to which it is connected.

A further object of the invention is to provide a reflection coefficient measuring circuit incorporating an unbalanced-to-balanced transformer and which operates with low dependence on frequency.

Another object of the invention is to provide a transmission-line bridge circuit having comparatively wide bandwidth and high accuracy.

The invention has as another object the provision of a relatively accurate reflection coefficient measuring circuit employing a nonreciprocal circulator. In particular, it is an object to provide such a measuring circuit that can operate with considerably less-than-perfect circulators. Further, the circulator circuit should even provide accurate measuring operation with input and output devices that present significant impedance mismatches to the measuring circuit. It is also an object that the circulator circuit produce a reflection coefficient-identifying signal of relatively large magnitude.

Other objects of the invention will in part be obvious and will in part appear hereinafter.

The invention accordingly comprises the features of construction, combinations of elements, and arrangements of parts exemplified in the constructions heerinafter set forth, and the several steps and the relation of one or more of such steps with respect to each of the other exemplified in the methods hereinafter disclosed, and the scope of the invention is indicated in the claims.

SUMMARY OF INVENTION

The present transmission-line circuit basically employs a four-arm bridge configuration having at least one port at each interconnection of two bridge arms. The ports are named according to the connections to the bridge circuit when used in a measuring system as detailed hereinafter; accordingly there is a "generator" port, a "detector" port, a "standard" port and an "unknown" port. A special case of the four-port circuit is a three-port circuit formed by permanently trerminating the standard port with a known, usually matched, impedance.

For most applications, the bridge arms are so constructed that the circuit satisfies two conditions. The first condition, a null output condition, is that with a signal applied to the generator port, the circuit develops minimum output voltage at the detector port when the unknown port is terminated with a matched termination. This minimum output voltage theoretically has zero magnitude. The second condition is that the input impedance at the unknown port be matched, i.e. that the input reflection coefficient at the unknown port be substantially zero, when design values of impedance are presented to the circuit at its other ports.

It has been found that these are the only requirements needed for the circuit to function as a theoretically errorless detector of complex reflection coefficients. More particularly, when excited at its generator port, these are the only conditions required for the circuit to develop at its detector port a voltage proportional in phase and magnitude to the reflection coefficient presented to the unknown port relative to a design impedance of the circuit.

When the circuit in addition satisfies certain symmetry requirements, it develops at the detector port a voltage proportional in phase and magnitude to the difference between the reflection coefficients at its standard and unknown ports.

The circuit performs the former measuring operation theoretically without error, and it compares two non-zero reflection coefficients with unusually low error.

It is believed that this is the first time anyone has established that these two conditions are necessary and sufficient to provide the foregoing operation with multiport radio frequency circuits. Further, it is understood that prior circuits do not attain the error level of the present circuits. It is also believed that this is the first time anyone has devised a circuit for the measurement of the vector difference between two non-zero reflection coefficients.

In the four-port bridge circuit, two arms are fed out-of-phase at the generator port. When the balanced input signal is developed external to the bridge circuit, it has no transmission line lengths whose operations are dependent on frequency. This allows the bridge circuit arms to be as short or as long as convenient. Further, when the operating frequency is changed, aside from a small uniform cyclic amplitude variation of the output signal, the circuit operation is theoretically frequency-independent.

The balanced input signal can be produced with a balanced source or with an unbalanced source through a balun, i.e. a transmission line unbalanced-to-balanced transformer. Where a balun is used, it is preferably incorporated in the bridge circuit. However, in accordance with a further feature of the invention, the balun is "applied" to the bridge circuit at a point where the balun impedance has minimal effect on the circuit.

In particular, the balun is applied across the generator port connection to the bridge arms. The balun has essentially no effect on the circuit when the external source maintains a fixed input voltage across the parallel combination of the bridge circuit and the balun, i.e. when a so-"leveled source" is used. With such a source, the balun is, in effect, connected to the bridge circuit at a point of zero impedance. With this arrangement and with a balun whose principal frequency dependence is a lower cutoff frequency, the bridge circuit is still essential frequency-independent above the balun cutoff frequency.

Another feature of the present bridge circuit is that the transmission line inner conductors therein incorporate resistive elements that materially diminish reflections at the internal interconnections. With the resistive elements arranged as described below, impedance mismatches presented to the bridge circuit by the source and the output device are decoupled from the unknown port and from the standard port. As a result, the bridge circuit substantially satisfies both of the above conditions with a source and/or output device that presents a significant impedance mismatch to it. Hence, with such external devices the circuit operation is still comparatively accurate and frequency-independent. Also, the resistive inner conductors enable the bridge circuit to operate at lower frequencies than otherwise possible; in fact, it operates at D.C. when the source is a D.C. supply.

Prior transmission line circuits operated as reflection coefficient detectors may have met the two conditions recited above at some frequency. However, at least most prior circuits operate with an accumulative frequency dependence. That is, the prior circuits have optimum operation at essentially a single frequency, and the operation deteriorates increasingly as the frequency departs from this value.

A common reason for this frequency-dependence of prior circuits is that their operation depends on transmission lines therein being resonant, which in turn requires that the line lengths are related to the operating wavelength, e.g. that certain transmission line paths are a quarter-wavelength. Other reasons include the use of coils or resonant circuits, whether lumped or distributed, which require theoretically infinite impedances for ideal operation but in fact develop lesser impedances that vary with frequency. For example, many prior circuits include a resonant balun within their structure that causes the circuit characteristics to change materially with frequency.

A further embodiment of the invention, referred to as a circulator circuit, is a three-port nonreciprocal circuit that meets the two conditions noted above. The circulator circuit employs a three-port circulator and two radio-frequency tuning devices. One tuner is in series with the unknown port and is set to satisfy the first condition. The other tuner is in series with either the generator port or the detector port and is set to satisfy the second condition.

The circulator circuit develops at the detector port a signal theoretically exactly proportional to the complex reflection coefficient presented to the unknown port.

In the past, it was thought that for a circulator to produce an accurate reflection coefficient-identifying output signal required a circulator having essentially ideal isolation, a matched generator, and a matched output device. Accordingly, the use of auxiliary tuners to simulate matched generators and matched measuring instruments is well known. However, the use of tuners in the present manner to overcome the limited isolation of a practical circulator is believed heretofore unknown. Further, the instant circulator circuit requires only two tuners to correct the deficiencies of the circulator, the source and the output device.

BRIEF DESCRIPTION OF DRAWINGS

For a fuller understanding of the nature and objects of the invention reference should be had to the following detailed description taken in connection with the accompanying drawings in which.

DESCRIPTION OF PREFERRED EMBODIMENTS

Four-port sensor

Figure 1:
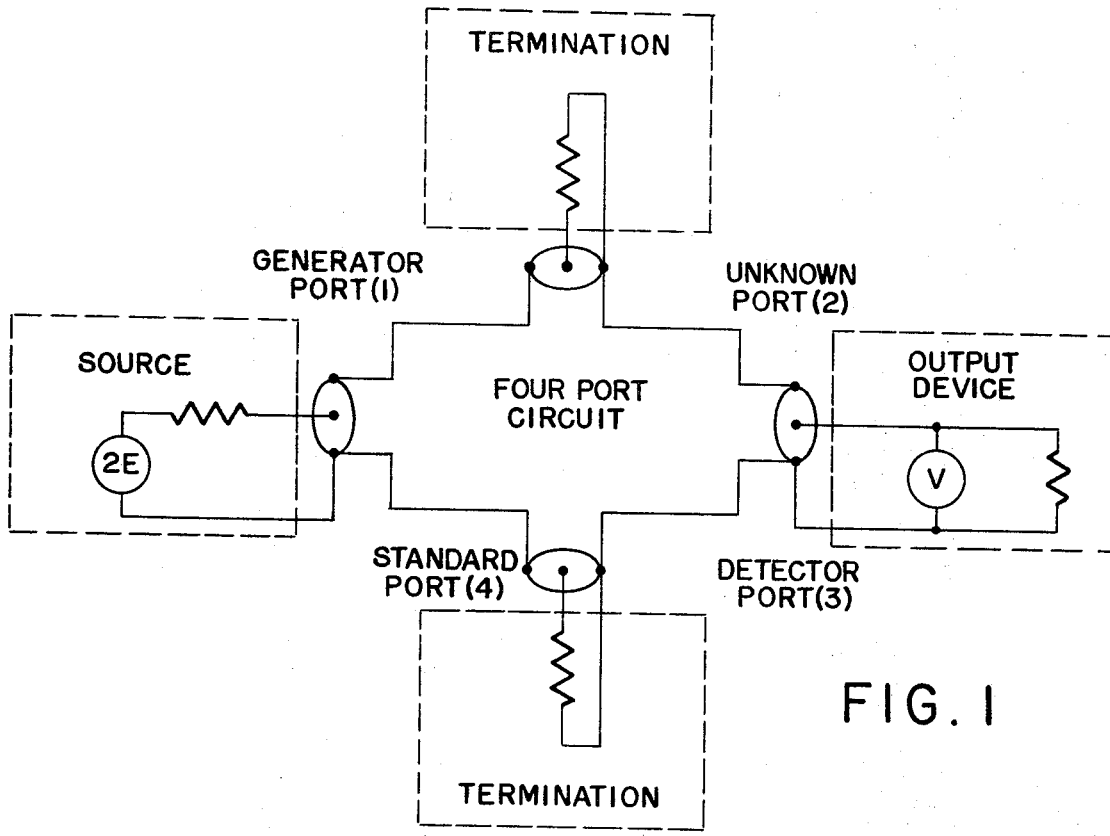
FIG. 1 shows an electrical circuit used in describing the invention.
Figure 2:
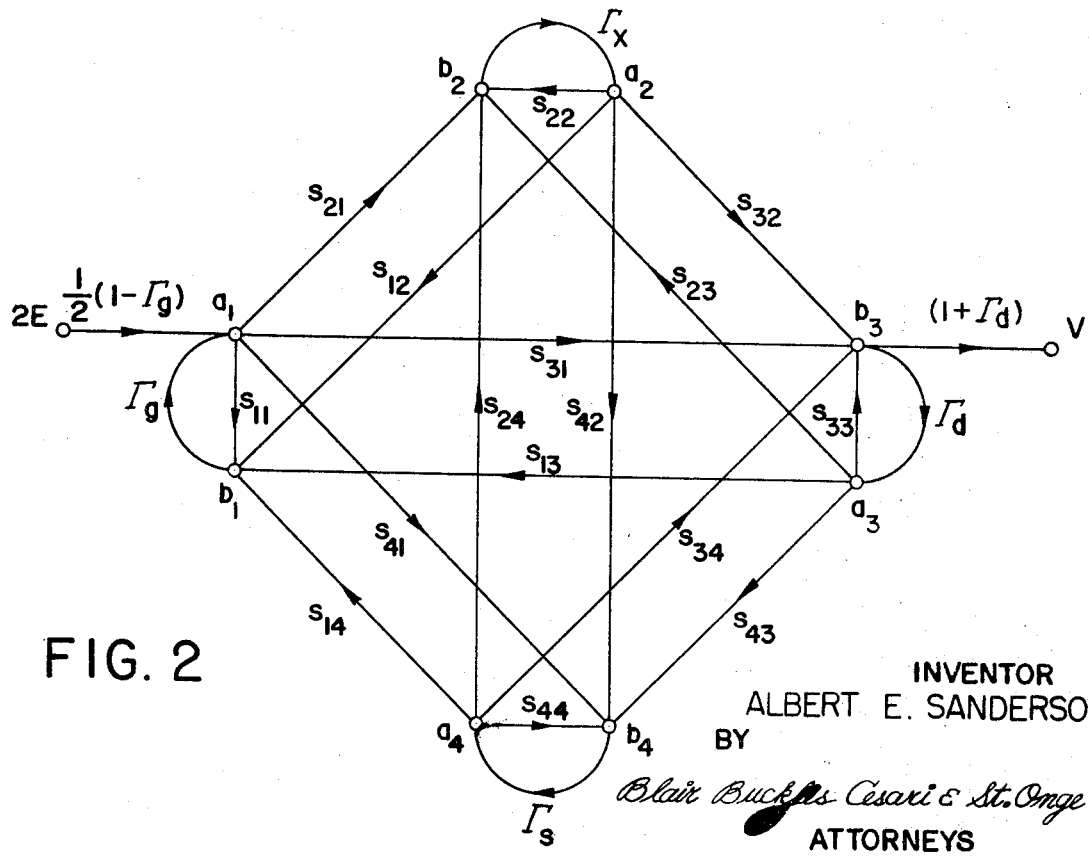
FIG. 2 is a signal flow graph for the circuit of FIG. 1.

The following paragraphs summarize the proof that the two conditions discussed above are both sufficient and necessary for an arbitrary reciprocal circuit which can be represented as having four ports to function as an ideal reflection-coefficient sensor, i.e. to produce at the detector port 3 a signal corresponding in phase and magnitude to the complex reflection coefficient presented to the unknown port 2 when energized at the generator port 1 and having a selected termination at the standard port 4. FIG. 1 shows a measuring system wherein the four-port circuit is connected to a source, an output device, and unknown and standard terminations. FIG. 2 shows the generalized signal flow graph for the circuit. The proof employs the mathematical techniques described in Analysis of Microwave Measurement Techniques by Means of Signal Flow Graphs, J. K. Hunton, IRE Trans. M.T.T., March 1960, pp. 206, 212.

The symbols in FIG. 2 are defined as follows for use throughout this specification and the claims appended hereto; in general all symbols other than $i$ and $j$ are complex numbers:

$2E$ is the Thevenin-equivalent source voltage at the generator port;

$V$ is the output voltage at the detector port;

$i$ and $j$ are integers 1, 2, 3 or 4 identifying the same-numbered port;

$a_i$ is the wave entering port $i$;

$b_i$ is the wave leaving port $i$;

$S_{ij}$ is scattering coefficient of the circuit, specially it is the ratio of waves $b_i$ and $a_j$, $(S_{ij}=b_i/a_j)$ with all other ports having matched terminations;

$\Gamma_x$ is the reflection coefficient the external termination presents to the unknown port;

$\Gamma_g$ is the reflection coefficient the source presents to the generator port;

$\Gamma_d$ is the reflection coefficient the output device presents to the detector port;

$\Gamma_s$ is the reflection coefficient the external termination presents to the standard port; and $\Gamma_i$ is the reflection coefficient looking into port $i$.

Equation 1 sets forth the transfer function $V/E$ of a reciprocal, i.e. $S_{ij}=S_{ji}$, four-port circuit; it is written by inspection of FIG. 2 and application of the "non-touching-loop rule" conventional for the analysis of signal flow graphs.

$$\frac{V}{E} = \frac{(1-\Gamma_g)(1+\Gamma_d)[S_{13}(1-\Gamma_x S_{22}-\Gamma_s S_{44}-\Gamma_x S_{24}^2\Gamma_s+\Gamma_x S_{22}\Gamma_s S_{44})+S_{12}\Gamma_x S_{23}(1-\Gamma_s S_{44})+S_{14}\Gamma_s S_{34}(1-\Gamma_x S_{22})+S_{12}\Gamma_x S_{24}\Gamma_s S_{34}+S_{14}\Gamma_s S_{24}\Gamma_x S_{23}]}{1-\Sigma L(1)+\Sigma L(2)-\Sigma L(3)+\Sigma L(4)} \quad (1)$$

where $\Sigma L(1)$ is the sum of all the first-order loops of the signal flow graph, $\Sigma L(2)$ is the sum of all second-order loops, $\Sigma L(3)$ is the sum of all third order loops and $\Sigma L(4)$ is the sum of all fourth-order loops.

The circuit is to satisfy the two conditions of the theorem. The first condition, null output for matched load, is expressed mathematically as $$V/E = 0 \text{ when } \Gamma_x = 0 \quad (2)$$

Substitution of these values into Eq. 1 establishes the following condition.

$$S_{13} + \Gamma_s(S_{14}S_{34} - S_{13}S_{44}) = 0 \quad (3)$$

Substitution of Eq. 3 into Eq. 1 reduces it to:

$$\frac{V}{E} = \frac{(1-\Gamma_g)(1+\Gamma_d)[S_{12}S_{23}+\Gamma_s(S_{12}S_{24}S_{34}+S_{14}S_{23}S_{24}-S_{12}S_{23}S_{44}-S_{13}S_{24}^2)]\Gamma_x}{\Delta} \quad (4)$$

where $\Delta$ is the denominator of Eq. 1.

The second condition, matched unknown-port input impedance, can be expressed mathematically as $$\Gamma_2 = 0 \quad (5)$$

This condition can more easily be applied to Eq. 4 if the denominator, $\Delta$, is split into two parts, those terms that include $\Gamma_x$ as a factor, and those that do not. Then $\Delta$ can be written $$\Delta = A + \Gamma_x B \quad (6)$$

It can be seen that the function $B$ consists of those portions of the loops of all orders that pass through $\Gamma_x$ and that lie between nodes $a_2$ and $b_2$. But this is by definition proportional to $\Gamma_2$, the input reflection coefficient of port 2 since $$\Gamma_2 = \frac{b_2}{a_2} = \frac{B}{\Delta'} \quad (7)$$

where $\Delta'$ is a function corresponding to the $\Delta$ of Eq. 4 for only those loops that do not pass through $\Gamma_x$. Eq. 5 is therefore equivalent to the condition $B=0$, and then Eq. 6 reduces to $$\Delta = A \quad (8)$$

Insertion of Eq. 8 into Eq. 4, with the expression for the term A written out explicitly, gives the following result.

$$\frac{V}{E} = \frac{(1-\Gamma_g)(1+\Gamma_d)[S_{12}S_{23}+\Gamma_s(S_{12}S_{24}S_{34}+S_{14}S_{23}S_{24}-S_{12}S_{23}S_{44}-S_{13}S_{24}^2)]\Gamma_x}{1-\Gamma_g S_{11}-\Gamma_d S_{33}-\Gamma_s S_{44}+\Gamma_g\Gamma_d S_{11}S_{33}+\Gamma_g\Gamma_s(S_{11}S_{44}-S_{14}^2)+\Gamma_d\Gamma_s(S_{33}S_{44}-S_{34}^2)+\Gamma_g\Gamma_d\Gamma_s(S_{14}^2 S_{33}+S_{11}S_{34}^2-S_{13}S_{14}S_{34})-S_{11}S_{33}S_{44})} \quad (9)$$

This equation is in the desired form of an ideal reflection-coefficient sensor. The quantity $\Gamma_x$ appears only once in the transfer function, multiplied and divided by quantities that are independent of $\Gamma_x$. This means that the output signal, $V$, varies directly in magnitude and phase with $\Gamma_x$, with theoretically no error.

Four-port comparator

When the above four-port circuit satisfies one additional condition, i.e. null output for $\Gamma_x = \Gamma_s$, it functions as a reflection-coefficient comparator. That is, the circuit produces at the detector port 3 a signal corresponding in phase and magnitude to the vector difference between the two complex reflection coefficients presented to the unknown and standard ports 2 and 4 when energized at the generator port 1.

The null-output condition above is expressed mathematically as $$V/E = 0 \text{ when } \Gamma_x = \Gamma_s \quad (10)$$

Substitution of Equation 10 into Equation 1 gives the following equation.

$$S_{13}+\Gamma_s(S_{12}S_{23}-S_{13}S_{22}-S_{13}S_{44}+S_{14}S_{34}) \\ +\Gamma_s^2(S_{12}S_{24}S_{34}+S_{14}S_{24}S_{23}-S_{12}S_{23}S_{44} \\ -S_{14}S_{22}S_{34}) = 0 \quad (11)$$

Since the condition expressed in Equation 11 must be satisfied for all possible values of $\Gamma_s$, the multiplier for each power of $\Gamma_s$ must equal zero separately. This gives $$S_{13} = 0 \quad (12)$$
$$S_{12}S_{23} = -S_{14}S_{34} \quad (13)$$
$$S_{22} = S_{44} \quad (14)$$
$$S_{12}S_{34} = -S_{14}S_{23} \quad (15)$$

Equations 13 and 15 can be satisfied in only two ways:

$$S_{12} = S_{14} \text{ and } S_{23} = -S_{34} \quad (16)$$

or $$S_{12} = -S_{14} \text{ and } S_{23} = S_{34} \quad (17)$$

Equations 16 and 17 indicate that the circuit requires symmetry in the magnitudes of the scattering coefficients, and that one pair of symmetrical coefficients must be of like sign and other pair must be of opposite sign.

Substitution of Equations 12, 14, and either 16 or 17 into Equation 1 gives the following result:

$$\frac{V}{E} = \frac{(1-\Gamma_g)(1+\Gamma_d)S_{12}S_{23}(\Gamma_x-\Gamma_s)}{\Delta} \quad (18)$$

The circuit must also satisfy, for some particular value of $\Gamma_s$, the two conditions of the network theorem. The first condition, expressed in Equation 2, when substituted in Equation 18 gives $$\Gamma_s = 0 \quad (19)$$

The second condition, expressed in Equation 5, can be more easily applied to Equation 18 if the denominator is split into four parts. There are the terms that include both $\Gamma_x$ and $\Gamma_s$ as factors, the terms that include only one or the other, and the terms that include neither. Therefore $\Delta$ can be written, $$\Delta = C + \Gamma_x D + \Gamma_s G + \Gamma_x\Gamma_s H \quad (20)$$

It can be seen that D is proportional to the input impedance of port 2 when $\Gamma_s = 0$ (as B in Equation 6 was in the above derivation). By the second condition of the theorem, therefore $$D = 0 \quad (21)$$

Similarly, G is proportional to the input impedance of port 4 with $\Gamma_x = 0$. By the symmetry conditions of Equation 16 or Equation 17, $G = D$ and therefore $$G = 0 \quad (22)$$

With Equations 21 and 22, Equation 20 reduces to:

$$\Delta = C + \Gamma_x\Gamma_s H \quad (23)$$

Insertion of Equation 23 into Equation 18, with the expressions for C and H written out explicitly, gives the following result, for the transfer function of the four-port Γ-comparing circuit:

$$\frac{V}{E} = \frac{(1-\Gamma_g)(1+\Gamma_d)S_{12}S_{23}(\Gamma_x-\Gamma_s)}{1-\Gamma_g S_{11}-\Gamma_d S_{33}+\Gamma_g\Gamma_d S_{11}S_{33}+\Gamma_x\Gamma_s\{-S_{24}{}^2+\Gamma_g(S_{11}S_{24}{}^2 +S_{12}{}^2 S_{22} \mp 2S_{12}{}^2 S_{24}) +\Gamma_d(S_{24}{}^2 S_{33}+S_{22}S_{23}{}^2 \pm 2S_{23}{}^2 S_{24}) +\Gamma_g\Gamma_d(4S_{12}{}^2 S_{23}{}^2 - S_{12}{}^2 S_{22}S_{33} - S_{11}S_{22}S_{23}{}^2 - S_{11}S_{24}{}^2 S_{33} \pm 2S_{12}{}^2 S_{24}S_{33} \mp 2S_{11}S_{23}{}^2 S_{24})\}}$$

(24)

This equation is in the desired form. The circuit produces an output signal that closely corresponds to ($\Gamma_x-\Gamma_s$), which is the desired vector difference between the two reflection coefficients. The error is essentially negligible when H (the terms enclosed in {}) is small. For example, in the four-port circuit described below, H is less than 0.002 and the maximum error is therefore less than 0.2%. Also, the error diminishes with the vector difference ($\Gamma_x-\Gamma_s$), and is zero when $\Gamma_x=\Gamma_s$, or $\Gamma_x=0$, or $\Gamma_s=0$. Where two signs, $\mp$ or $\pm$, appear in Equation 24, the upper signs apply when Equation 16 is used to satisfy the symmetry requirements whereas the lower signs apply when Equation 17 is used.

Three-port circuits

The transfer function for a three-port circuit that satisfies the two conditions of the theorem can be derived in much the same manner as Equation 24 was derived. The two conditions, expressed in Equations 2 and 5, are applied to the general transfer function of a three-port circuit.

The result is as follows, and applies to both reciprocal and nonreciprocal three-port circuits.

$$\frac{V}{E} = \frac{(1-\Gamma_g)(1+\Gamma_d)S_{21}S_{32}\Gamma_x}{1-\Gamma_g S_{11}-\Gamma_d S_{33}+\Gamma_g\Gamma_d S_{11}S_{33}} \quad (25)$$

This equation is in the desired form, a constant times the unknown reflection coefficient.

Circuits with more than four ports

The above results can easily be expanded to circuits with more than two side ports (the standard and unknown ports are "side" ports), and/or to circuits with multiple generator ports and, where desired, to circuits with multiple detector ports. In general, when the circuit satisfies the two conditions, expressed in Eqs. 2 and 5, at any side port, the circuit has a transfer function that identifies the reflection coefficient presented to that side port with theoretically no error.

Multiple side-port circuits that can be arranged to meet the two conditions discussed above at each individual side port with all other side ports matched, can have a transfer function proportional to any desired linear vector function of the individual reflection coefficients, where that function involves only addition, subtraction, or multiplication by an arbitrary constant $\leq 1$. Any error in this transfer function is due to terms similar to the term $\Gamma_s\Gamma_x H$ in Eq. 23, and can be held small, as discussed above in the paragraph following Eq. 24.

Figure 3:
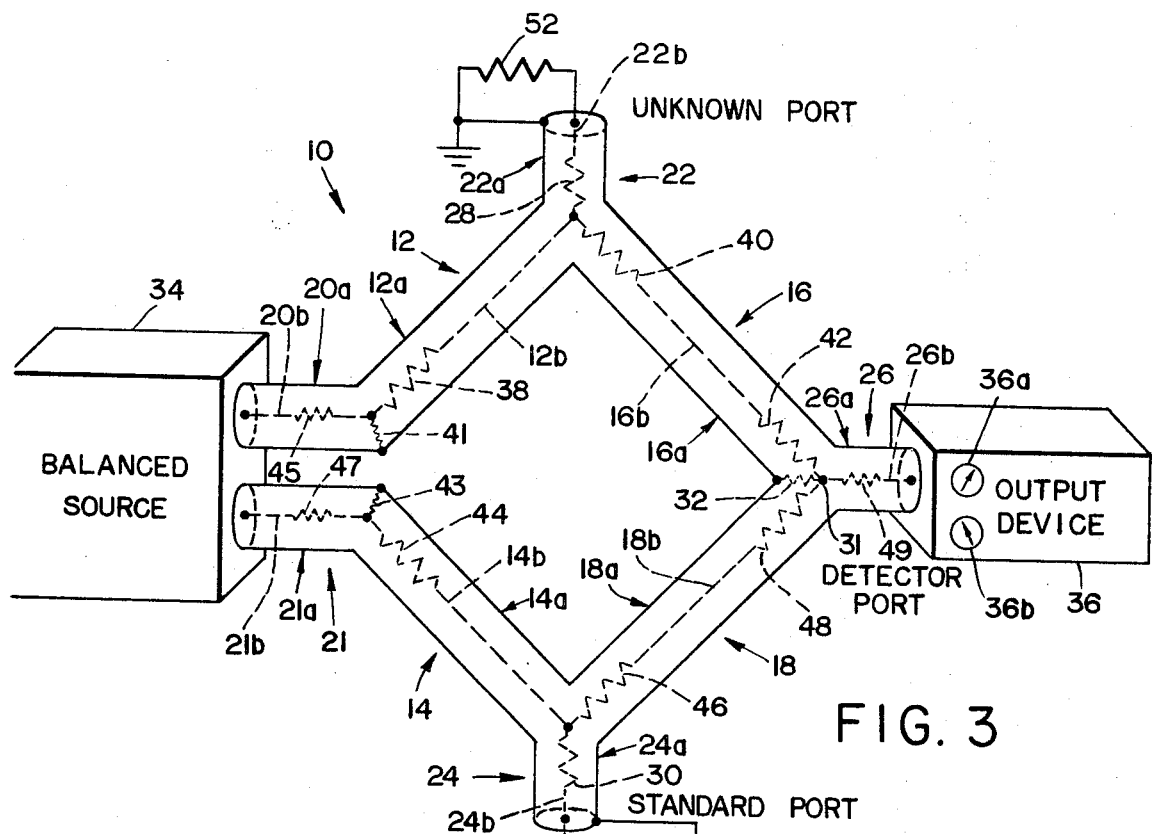
FIG. 3 shows a transmission line bridge circuit connected with a radio frequency source and an output device.

In multiple generator port circuits, such as the two generator-port circuit 62 of FIG. 3, the null output condition is generally satisfied by cancellation at the detector port of the contributions from the two generator ports fed in phase opposition. The transfer function of the circuit has the same form as Eq. 24, i.e. is of the form:

$$\frac{V}{E} = \frac{(1-\Gamma_g)(1+\Gamma_d)S_{12}S_{23}(\Gamma_x-\Gamma_s)}{N+\Gamma_x\Gamma_s M} \quad (26)$$

where N and M depend only on the scattering coefficients and on $\Gamma_d$ and $\Gamma_g$; they are independent of $\Gamma_x$ and $\Gamma_s$.

Five-port circuit; FIG. 3

Turning now to FIG. 3, a five-port transmission line bridge circuit 10 embodying the invention has four interconnected coaxial transmission line arms 12, 14, 16 and 18, having outer conductors 12a, 14a, 16a and 18a and inner conductors 12b, 14b, 16b and 18b. At "generator" ports 20 and 21 of the circuit 10, the outer conductors 12a and 14a are connected to generator port outer conductors 20a and 21a, respectively. Extensions of the inner conductors of arms 12 and 14 form generator port inner condnuctors 20b and 21b within the outer conductors 20a and 21a, respectively, in a balanced pair of coaxial transmission lines.

The other end of arm 12 is in series with arm 16 at an "unknown" port 22, and the end of arm 14 remote from the generator port 21 is in series with arm 18 at a "standard" port 24; the unknown and standard ports are often referred to as "side" ports. The remaining ends of the arms 16 and 18 are connected together at a coaxial "detector" port 26, with the detector port inner conductor 26b being connected to the interconnection 31 of the inner conductors 16b and 18b.

A source 34 of a balanced radio-frequency signal applies equal magnitude, opposite phase forward waves to the two generator ports 20 and 21. Further, an output device 36 responsive to the relative phase and magnitude of its input signal is connected to the detector port of the bridge circuit. An R.F. vector voltmeter, or a two-dimensional cathode-ray Smith chart plotter, as disclosed in U.S. Pat. Nos. 2,983,866 and 3,061,780 is a suitable output device.

The FIG. 3 bridge circuit is further constructed to satisfy Eq. 2. Also, it satisfies Eq. 5 at both side ports 22 and 24, i.e. $\Gamma_2=0$ when $\Gamma_s=0$ and $\Gamma_4=0$ when $\Gamma_x=0$. The circuit therefore has a transfer function, between generator and detector ports, proportional to the vector difference ($\Gamma_x-\Gamma_s$) and of the form given in Eq. 26. As a result, when a termination 52 is connected across the unknown port 22 and another termination 54 is connected across the standard port, in response to the source signal, the bridge circuit 10 produces at the detector port an output signal whose phase and magnitude are closely directly proportional to, and hence identify, the difference in phase and magnitude between the complex reflection coefficients the terminations 52 and 54 present to the two side ports. In response to this signal, the output device indicates on meters 36a and 36b the relative phase and magnitude, respectively, of the output signal. The meter readings accordingly identify with relatively high accuracy the difference in the reflection coefficients of the terminations 52 and 54, which is the desired information. And when the two reflection coefficients are equal, or when one of them is zero, the meter readings theoretically identify the reflection coefficient difference with no error in accordance with Eq. 26.

The terminations 52 and 54 are shown simply as resistors. However, by way of example, in actual practice, a coaxial termination of known impedance is connected to port 24 and a device whose impedance is to be compared with this standard termination is connected to port 22.

With further reference to FIG. 3, the source 34 applies to the two generator port inner conductors forward waves having equal magnitude and opposite phase, i.e. 180° out of phase. To produce these balanced signals, the source 34 can have a push-pull type output stage. Alternatively, the two signals can be coupled from a single resonant cavity in the source with two loops or probes coupled to equal amplitude and opposite phase fields. Another alternative is that the source 34 employ a conventional unbalanced generator and a balun, i.e. an unbalanced-to-balanced transformer, that converts the generator signal to the desired balanced signals. The source output impedances at the two generator ports 20 and 21 should be equal to maintain the desired symmetry.

In the bridge circuit 10, the electrical length of the signal path between the generator port 20 and the detector port 26 through arms 12 and 16 is the same as the length of the parallel path between ports 21 and 26 through the arms 14 and 18. As a result, the signal applied to the inner conductor 20b encounters the same phase delay in travelling through the circuit 10 from the generator port 20 to the detector port 26 as the signal applied to the inner conductor 21b encounters in travelling between the generator port 21 and the detector port 26. Further, the electrical length of arm 16 is equal to the electrical length of arm 18 and the lengths of inner conductors 22b and 24b also are equal. Hence, signals propagating between the standard and detector ports encounter the same phase delay as signals propagating between the unknown and detector ports. With these constraints, the electrical lengths of the arms 12 and 14 will also be the same. These conditions are all satisfied independently of frequency in circuit 10.

As also shown in FIG. 3, the unknown port inner conductor 22b includes a series resistor 28 at its inner end, i.e. adjacent the connection to the inner conductors 12b and 16b. A resistor 30 is in series in the inner end of the standard-port inner conductor 24b. Adjacent the detector port, a resistor 32 is connected from the interconnection 31 to the outer conductor structure. In addition, a resistor 38 is series in the inner conductor 12b adjacent the connection to the inner conductor 20b. Further, resistors 40 and 42 are connected in the inner conductor 16b adjacent the ends thereof that connect to the inner conductors 12b and 18b respectively. Similarly, a resistor 44 is in series in the inner conductor 14b at its end adjacent the inner conductor 21b, and resistors 46 and 48 are in series in the ends of the inner conductor 18b. These resistors are preferably short relative to the wavelength and they are preferably as close to the designated ends of the inner conductors as practical.

As also shown in FIG. 3, at the generator ports 20 and 21, the generalized circuit 10 has shunt resistors 41 and 43 connected to the outer conductor structure from the inner ends of the inner conductors 20b and 21b, respectively. Also, each of these inner conductors can include a series resistor 45 and 47, respectively. When the bridge circuit is designed for operation with a source 34 having a non-zero output impedance that does not exceed the equal characteristic impedances $R_{12}$ and $R_{14}$ of arms 12 and 14, the two series resistors 38 and 44 are omitted. Alternatively, when the generator impedance exceeds $R_{12}=R_{14}$, the two series resistors 45 and 47 are omitted. When the generator impedance equals $R_{12}=R_{14}$, the six resistors 38, 41, 43, 44, 45, 47 are all omitted.

Finally, the generalized bridge circuit 10 has a series resistor 49 in the inner end of the detector port inner conductor 26b. This resistor has zero value when the characteristic impedances $R_{16}$ and $R_{18}$ of arms 16 and 18 are more than a threshold value equal to 1⅓ times the output device design impedance, whereas the shunt resistor 32 has an open circuit value when $R_{16}$ and $R_{18}$ are less than the threshold value. Both resistors 32 and 49 are omitted when $R_{16}$ and $R_{18}$ equal the threshold value. Thus, generally only one of the resistors 32 and 49 is used in a given circuit and sometimes both are omitted.

In any event, the circuit 10 is symmetrical about a plane transverse to the FIG. 3 drawing and passing between the inner conductors 20b and 21b and through the inner conductor 26b, i.e. the circuit has electrical symmetry between the signal path from the generator port inner conductor 20b to the detector port inner conductor and the parallel electrical path from the generator port inner conductor 21b to the detector port inner conductor.

These equal line lengths and symmetries provide a preferred manner of satisfying the first, null output, condition discussed above in a circuit having theoretically no dependence on frequency.

The values of the other resistors and of the transmission line characteristic impedances in the bridge circuit 10 also are determined to satisfy the foregoing two conditions. The second condition requires, among other things, that the bridge arm 12 be matched to the generator port 20 and that the arm 16 be matched to the impedances presented to it at its end remote from the unknown port. These impedance conditions theoretically eliminate reflections toward the unknown port from the generator port 20 and from the detector port. Similarly, the arm 14 is matched to the generator port 21 and the arm 18 is matched to the impedances presented to it at its end remote from the standard port.

Many sets of resistance and impedance values satisfy the foregoing conditions. Accordingly, the preferred values are determined to provide further advantages. One is that the input impedance at the detector port 26 be matched; which is used in determining the value of resistors 38 and 49. Another is that with $\Gamma_s=\Gamma_x=0$, all the transmission lines within the circuit 10 be matched in both directions as seen from the middle of each arm through whatever resistors are connected in each end thereof.

Figure 4:
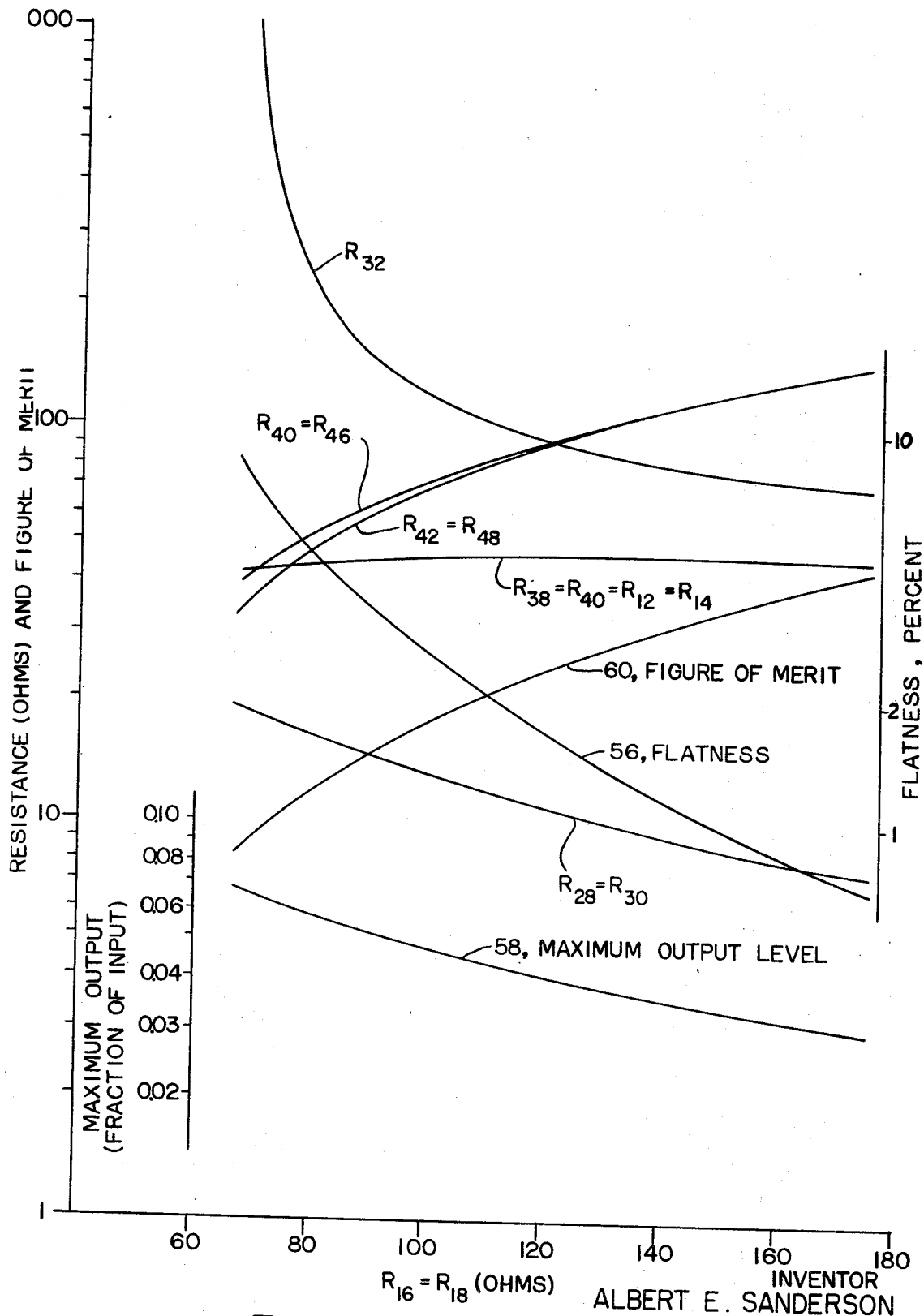
FIG. 4 is a graph showing resistance values and properties of the FIG. 3 bridge circuit as a function of the characteristic impedance of one bridge arm transmission line therein.

FIG. 4 shows the values of the bridge circuit 10 resistances and of the resistive component ($R_{12}$, $R_{14}$) of characteristic impedance of each arm 12 and 14 that meet the foregoing conditions for values of the resistive component ($R_{16}$, $R_{18}$) of the characteristic impedance of arms 16 and 18 between 66⅔ and 175 ohms. The curves are for circuits designed for optimum operation with an output device having a 50-ohm input impedance. Further, the source impedance at each generator port is equal to the characteristic impedance of the arms 12, 14 connected thereto. Hence, the resistor 38 represents the source impedance presented to port 20 and the resistor 44 represents the source impedance presented to port 21. In addition, the resistors 41, 43, 45, 47 and 49 are omitted from the circuit.

By way of example, when $R_{16}=R_{18}=100$ ohms, the remaining resistances and resistive components have the following approximate values:

|  | Ohms |
|---|---|
| $R_{12}=R_{14}=R_{38}=R_{44}$ | 46 |
| $R_{28}=R_{30}$ | 13 |
| $R_{40}=R_{46}$ | 73 |
| $R_{42}=R_{48}$ | 71 |
| $R_{32}$ | 121 |

With these values, the input impedance at each of the three ports 22, 24 and 26 is substantially 50 ohms, and that of ports 20 and 21 are substantially 46 ohms.

FIG. 4 also shows, with curves 56, 58 and 60, three performance properties of the FIG. 3 bridge circuit 10; these will be discussed below after the circuit operation is considered in further detail.

With the bridge circuit 10 constructed as described above and when the terminations 52 and 54 present matched impedances to the side ports, a portion of the source signal on the inner conductor 20b is transferred directly to the detector port, by way of arms 12 and 16. Similarly, a like portion of the source signal on the inner conductor 21b is transferred directly to the detector port by way of arms 14 and 18. These two signal portions applied to the detector port have equal magnitude and opposite phase and therefore cancel. Ideally, there are no other signals present at the detector port, for there are no reflections from either side port or from any internal transmission lines because they are all matched in both directions.

In actual practice, however, with arbitrary impedances at the side ports, the signal the source 34 applies to each inner conductor 20b and 21b can be considered as developing three principal signal components at the detector port. Hence, in the general case, the output signal at the detector port is principally the sum of the six signal components.

In particular, when different unmatched terminations are connected to the unknown and standard ports, the bridge circuit can still be considered as developing a first signal component at the detector port from the source signal on conductor 20b via the arms 12 and 16. Similarly, the source signal on conductor 21b develops, via arms 14 and 18, a second signal component at the detector port which is equal and opposite to the first component. The first and second signal components accordingly cancel, as when matched terminations are connected to the two side ports.

However, in addition to the first and second components, the bridge circuit applies a third signal component to the detector port from arm 16 and a fourth signal component from arm 18. The third signal component corresponds in phase and magnitude substantially exclusively to the reflection coefficient the termination 52 presents to the unknown port, and the fourth signal component likewise corresponds in phase and magnitude to the reflection coefficient the termination 54 presents to the standard port. The third signal component is produced by the source energy from conductor 20b that is reflected to the arm 16 from the unknown port when this port is mismatched.

Similarly, the fourth signal component is produced by the source energy from conductor 21b that is reflected to the arm 18 from the standard port when this port is mismatched.

The vector sum of the third and fourth signal components is developed at the detector port and applied to the output device 36. It corresponds to, and identifies, the difference in phase and magnitude between the reflection coefficients presented to the unknown port 22 and the standard port 24. Hence, this is the desired output signal. In response to it, the output device provides the desired indication of the difference between the side port reflection coefficients.

Aside from further, essentially negligible, components, the bridge circuit 10 generally develops at the detector port two further and unwanted signal components, generally of considerably lesser magnitude than any of the first four components. One of these is a fifth signal component produced by part of the energy that produces the first signal component travelling from arm 16 to arm 18 rather than to the detector port. The reflection of this small but generally measurable signal from the standard port back to the detector port is the fifth signal component. The magnitude and phase of the fifth signal component depend on the reflection coefficient at the standard port. Thus, there are two signal components at the detector port, i.e. the fourth and fifth signal components, whose phases and magnitudes depend on the reflection coefficient at the standard port. However, the relative phase difference between the fourth and fifth signal components varies with frequency. This is because the fifth signal component travels substantially twice the distance from the interconnection 31 to the standard port further than the fourth signal component. As a result, at the detector port, the phase and magnitude of the resultant of the fourth and fifth signal components undergoes a cyclic variation as the frequency of the source 34 changes. The amount of the variation is dependent on the magnitude of the fifth component relative to the magnitude of the fourth component.

In the same manner, a sixth signal component is developed at the detector port from energy applied to the generator port inner conductor 21b and which travels on the arms 14, 18 and 16 to the unknown port and is then reflected back to the detector port. The sum of this sixth signal component and of the third signal component, both of which depend on the reflection coefficient at the unknown port, varies back and forth over a small but generally measurable range as the source frequency is changed, just as the sum of the fourth and fifth signals undergoes a cyclic variation with frequency.

The cyclic variations of the sum of the fourth and fifth signal components and of the sum of the third and sixth signal components cause the single resultant signal they develop in the detector port to undergo cyclic variation with frequency. However, the maximum amplitude of the variation is relatively independent of frequency; hence it is referred to as a uniform cyclic variation.

This variation of the single resultant signal in the detector port is theoretically the only frequency-sensitive deviation from ideal operation which the bridge circuit 10 develops as the frequency of the source changes. It represents a radial expansion and contraction of a Smith chart display of the difference in reflection coefficients. The measure of this deviation, termed "flatness," is the variation of the output signal magnitude as a function of frequency when the standard port has a matched termination and a unity reflection coefficient is applied to the unknown port. Curve 56 in FIG. 4 shows that the flatness of the frequency response improves from approximately 8% to nearly ½% as the equal resistive components $R_{16}$, $R_{18}$ are increased over the illustrated range.

A further operating characteristic of the FIG. 3 bridge circuit 10, termed the maximum output level, is a measure of the detector port voltage magnitude, expressed as a decimal fraction of the source voltage magnitude, when $\Gamma_x=1$ and $\Gamma_s=0$. Curve 58 in FIG. 4 is a plot of the value of the maximum output level. Comparison with curve 56 indicates that in general as the flatness improves, the magnitude of the output signal decreases.

The performance of the bridge circuit 10 can further be measured with a figure of merit that measures the magnitude of the detector port output signal for a given generator port input signal, relative to the flatness, i.e. frequency-dependent output signal error. Thus, a large figure of merit is desirable, and curve 60 in FIG. 4 illustrates the manner in which the figure of merit increases from slightly below 7 to above 40 as $R_{16}$ and $R_{18}$ are increased from 66⅔ ohms to 175 ohms.

Thus, the bridge circuit of FIG. 3 produces an output signal identifying the differences in phase and magnitude between two complex reflection coefficients. The output signal has only a small uniform cyclic variation with frequency, otherwise its operation is essentially independent of frequency. Further, the output signal identifies the difference in reflection coefficients with comparatively high accuracy. Also, the figure of merit of the circuit is believed to be far in excess of prior circuits that compare complex reflection coefficients.

It should also be noted that the bridge circuit of FIG. 3 can be used as a radio frequency coupler. For example, with matched terminations at each side port, the output signal from the source 34 is delivered equally to the side port terminations with substantially no signal appearing at the detector port. As with the measuring operation, this coupling operation is substantially independent of frequency. Unequal divisions of power from the source to the side ports can also be attained by providing selected reflection coefficients at the standard and unknown ports.

Four-port circuit

Figure 5:
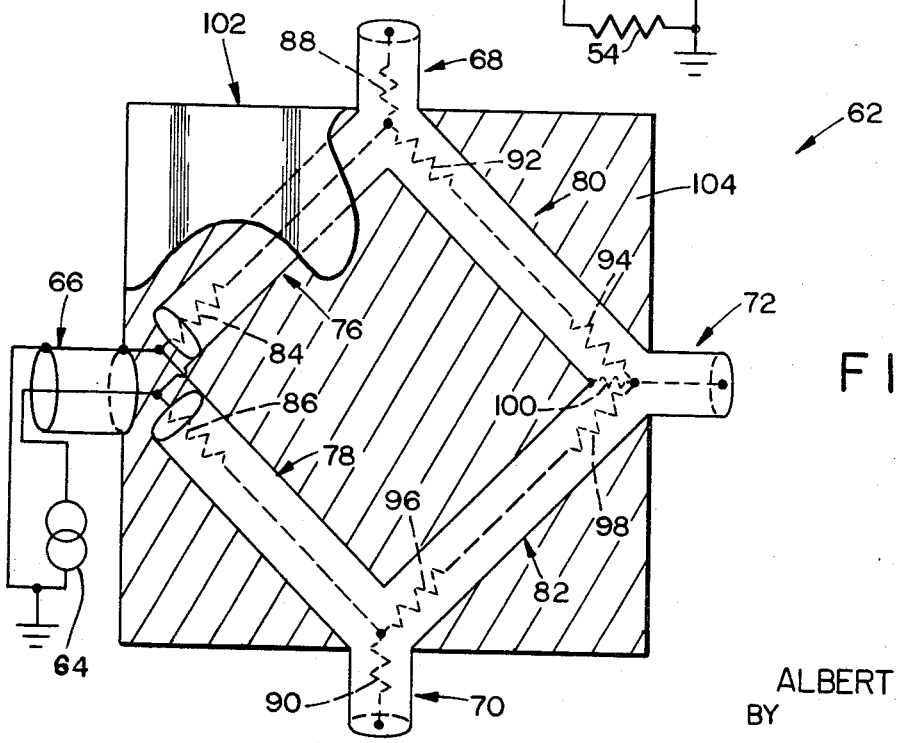
FIG. 5 is a schematic representation of another transmission line circuit connected with an unbalanced source.

FIG. 5 shows a four-port transmission line circuit indicated generally at 62 that comprises a bridge circuit, essentially identical to the circuit 10 of FIG. 3, combined with a transmission-line transformer so that the combined circuit 62 can be operated with a conventional unbalanced source 64 connected directly to the circuit generator port 66.

The frequency of the source 64 preferably can be changed. Further, the circuit 62 is designed for operation with a source 64 whose output signals are "leveled." That is, the source 64 preferably employs a feedback circuit that maintains the magnitude of its output voltage |uniform as the frequency is changed. The Hewlett-Packard Journal, vol. 15 No. 4, published by the Hewlett-Packard Company, describes a suitable unbalanced leveled source. Such a source has a theoretically zero output impedance. That is, it presents to the bridge circuit a $\Gamma_g$ of $-1$. Although the illustrated bridge circuit 62 is arranged for optimum operation with such a leveled source, the invention is not so limited.

The four-port circuit 62 is further designed for operation with an output device having a 50-ohm input impedance. The circuit 62 accordingly has four coaxial transmission line arms 76, 78, 80 and 82 interconnecting an unknown port 68, a detector port 72, a standard port 70 and the generator port in the same manner as in the circuit of 10 of FIG. 3. Further, the inner conductors of arms 76 and 78 include resistors 84 and 86, respectively, at their ends adjacent the generator port. And, the unknown port and standrad port inner conductors include resistors 88 and 90 respectively, at their innermost ends. The inner conductors of arms 80 and 82 have, respectively, resistors 92 and 94 and resistors 96 and 98 at their extreme ends. Further, a resistor 100 is connected to the outer conductor structure from the interconnection of the inner conductors in the arms 80 and 82 and in the detector port 72. The values of these resistors and of the characteristic impedances of the coaxial arms are determined in the same manner as described above for the corresponding parts of the FIG. 3 circuit and with reference to the graph of FIG. 4.

With further reference to FIG. 5, coaxial arms 76 and 78 are cross-connected to the generator port 66 to transform the unbalanced source signal to a balanced signal that is divided between the two arms with opposite phases. An enclosure 102 forms a cavity in parallel with the generator port. In particular, the outer conductor of arm 76 and the inner conductor of arm 78 are connected together to the generator port inner conductor. Also, the inner conductor of arm 76 and the arm 78 outer conductor are together connected to the generator port outer conductor. This cross-connection applies the signal on the generator port to the arms 76 and 78 with opposite phase and with equal amplitude voltages.

The enclosure 102, suitably a parallelopiped of conductive material, encloses the four transmission-line arms. The outer conductors of the four ports 66–70 are connected to the enclosure where the ports pass through its walls. The cross-connection of the arms 76 and 78 with the generator port is preferably closely spaced from the enclosure wall and from the end of generator port outer conductor to minimize the impedance discontinuity between the port 66 and arms 76, 78.

In addition, within the enclosure 102, an electrically lossy material 104 substantially fills the space outside the outer conductors of the four arms. The purpose of this material, which preferably has relatively high electrical loss throughout the desired operating range of frequency, is to lower the quality factor (Q) of the cavity formed by the enclosure 102 to a relatively low value, suitably below 10.

With this construction, at frequencies where the electrical length of arm 76 approaches an odd integral multiple of a half-wavelength, at which frequency, in a lossless cavity, the arm would present an essentially short-circuit impedance between the generator port conductors, the low-Q cavity maintains the impedance at a considerably higher value. Accordingly, although the leveled source 64 is driving the enclosure-outer conductor impedance in parallel with the arms 76 and 78, it applies a frequency-independent voltage to the circuit 62 so long as the current drawn by the cavity does not overload the source, i.e., provided the frequency is above the value where the arms 76 and 78 are each only a small fraction of a wavelength, e.g. less than a sixteenth wavelength for many commercially available sources. Thus, the circuit 62 operates with a high degree of uniformity over a range of frequencies theoretically limited principally by the minimum length of each arm 76 and 78.

In addition to the use of a lossy dielectric as the material 104, ferrite materials can be employed within the enclosure 102. An alternative or supplement to the uee of a lossy material 104 within the enclosure is to make the enclosure 102 of a lossy conductor such as stainless steel.

The source 64 and balun of FIG. 5 can be used as the FIG. 1 source 34. This can be arranged by removing the FIG. 5 ports 68, 70 and 72 and the arms 80 and 82. The "open" ends of the remaining arms 76 and 78 are then brought out of the enclosure 102 and connected to the FIG. 1 generator ports 20 and 21. Where the FIG. 5 source 64 is leveled, the FIG. 1 resistors 41, 43, 45 and 47 are omitted. Further, the FIG. 5 resistors 84 and 86 are the FIG. 1 resistors 38 and 44, respectively.

With further reference to FIG. 5, the bridge circuit 62 can also be used with a commercially available matched detector connected to the standard port 70. Such a detector will present a matched impedance to the port 70 and develop a voltage that theoretically varies only with magnitude of the source signal applied to the generator port 66. This voltage can be used to "level" the source 64. Alternatively, essentially equivalent results can be obtained where the source 64 is not leveled, but the voltage for this matched detector is applied to a ratio-type output device connected to the detector port 72.

Three-port circuit

Figure 6:
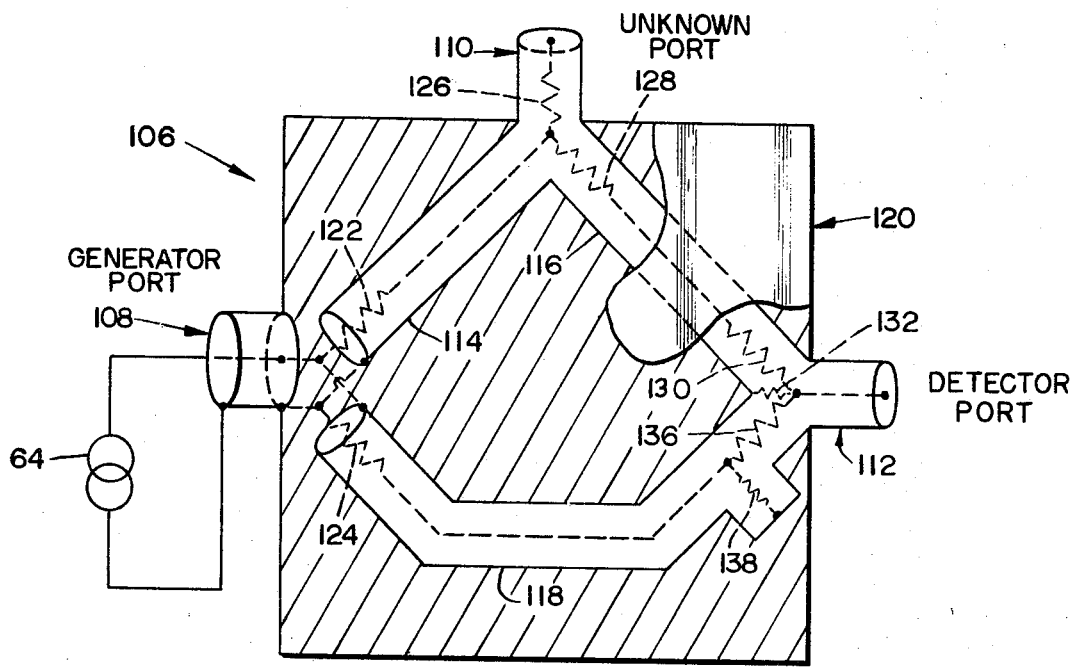
FIG. 6 is a schematic representation of a three-port transmission line circuit.

FIG. 6 shows a three-port circuit 106 derived from the four-port circuit of FIG. 5 by termination of the standard port 68 of FIG. 5 in its characteristic impedance, i.e. a matched impedance. The circuit 106 accordingly has the transfer function expressed in Eq. 25. Hence, it produces at its detector port 112 an output signal corresponding in phase and magnitude to the value of the reflection coefficient presented to its unknown port 110 relative to the known value of this matched termination.

In particular, the three-port circuit 106 has coaxial transmission lines 114 and 116 respectively connected between the generator and unknown ports, and between the unknown and detector ports. A further coaxial transmission line 118, having the same electrical length as the combined length of the two lines 114 and 116, provides a second path between the generator port and the detector port. The transmission lines 114 and 118 are connected to the generator port 108 in a balun arrangement identical to that described above for the circuit 62 of FIG. 3 and a low Q cavity 120 encloses the transmission lines and the balun interconnections.

As with circuit 62 of FIG. 5, the three-port circuit 106 of FIG. 6 has inner conductor resistors 122 and 124 in the generator port ends of arms 114 and 118, a resistor 126 in the unknown port, a further pair of inner conductor resistors 128 and 130 in the ends of arms 116 and a shunt resistor 132 at the interconnection of arms 116 and 118 with the detector port.

The circuit 106 also has a shunt resistor 138 connected from the inner conductor in arm 118 to the outer conductor structure. This resistor can be considered as a combination of the FIG. 3 resistors 30 and 54 that present a selected, usually matched shunt impedance to the arms 14 and 18. The final inner conductor resistor 136 in the circuit 106 is in the line 118 adjacent the connection to the detector port. This resistor combines the resistors 46 and 48 of FIG. 3 and hence its value is equal to their sum.

Although shown in FIG. 6 adjacent the detector-port end of the line 118, the shunt resistor 138 can be connected anywhere in the inner conductor of line 118 between its ends provided the line 118 is matched in both directions. Where the shunt resistor 138 is displaced from the detector end of line 118, the resistor 136 should be replaced by two resistors corresponding to the resistors 46 and 48 of FIG. 3. Thus, the arrangement shown in FIG. 6 is generally preferred because it requires the least number of resistors.

The values of the resistors and resistive impedance components in the circuit 106 are again determined as described above with reference to FIGS. 3 and 4. The following values illustrate one combination that satisfies all the conditions discussed with reference to the FIG. 3 bridge circuit 10. These values provide matched 75-ohm impedances at the unknown and detector ports.

| | Ohms |
|---|---|
| $R_{122}=R_{124}$ | 70 |
| $R_{126}$ | 20 |
| $R_{128}$ | 110 |
| $R_{130}$ | 96 |
| $R_{132}$ | 181 |
| $R_{136}$ | 206 |
| $R_{138}$ | 95 |
| $R_{114}$ | 70 |
| $R_{116}$ | 150 |
| $R_{118}$ | 70 |

Three-port nonreciprocal circuit

Figure 7:
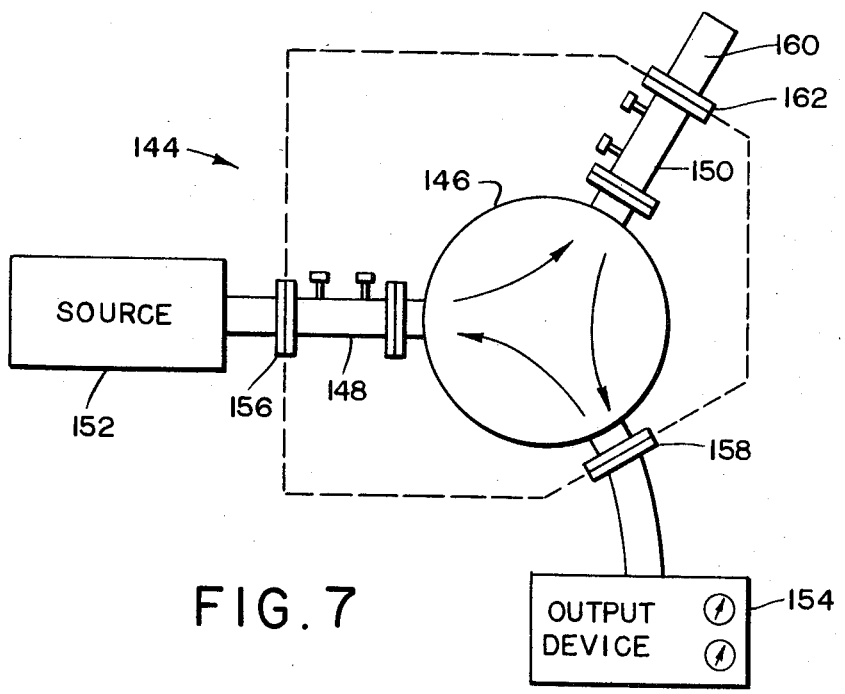
FIG. 7 shows a circulator circuit connected with a radio frequency source and an output device.

As noted above, in a further embodiment of the invention a multiport nonreciprocal circulator is fitted with tuners set to satisfy the two conditions provided by this invention. In FIG. 7 a circulator circuit 144, constructed in this manner with a three-port ferrite circulator 146 and coaxial tuners 148 and 150, is connected with an unbalanced source 152 and an output device 154 in a reflection coefficient measuring system.

The circulator circuit 144 has a generator port 156 to which the source 152 is connected and a detector port 158 to which the output device is connected. The component 160 whose reflection coefficient is being measured is connected to an unknown port 162 of the circuit 144.

In response to the source signal, the circuit produces at the detector port a radio-frequency voltage whose phase and magnitude are proportional to and identify the reflection coefficient the component 160 presents to the port 162. The output device 154 processes this voltage to produce the type of display desired.

The circuit 144 is constructed from the realization that the same two conditions set forth above, i.e. (1) null output with a matched unknown load and (2) matched impedance looking into the unknown port with the source and output device connected, are the only ones required for the three-port network to produce an output signal identifying the reflection coefficient at its unknown port. Accordingly, the circuit has the transfer function set forth in Eq. 25.

The tuners 148 and 150 are adjusted in the following manner for the circuit 144 to satisfy the two conditions at a desired test frequency. First, with the assembled circuit 144 connected to the source 152 and measuring device 154, the tuner 150 is adjusted to satisfy the first condition, i.e. to null the signal at the detector port 158 when the component 160 is matched, i.e. equals the desired reference impedance for reflection coefficient measurements with the circuit 144. The effect of adjusting the tuner 150 for this condition is to provide the tuner with scattering coefficients such that the terminated tuner reflects into the circulator 146 a signal of the correct phase and magnitude to cancel the signal the circulator 146 transfers directly from its port connected to the tuner 148 to the detector port 158. That is, the circulator 146 generally has less than perfect isolation and hence it transfers to the detector port 158 a portion of the signal applied to the generator port 156. The tuner 150 is adjusted to reflect to the detector port a signal that cancels this component of the source signal the circulator applies to the detector port.

With the tuner 150 set to satisfy the first condition, the tuner 148 is adjusted to satisfy the second condition. This can be done by presenting a unity reflection coeffiicent of controllable phase to the unknown port and adjusting the tuner 148 so that the magnitude of the detector port signal remains constant as the phase of the reflection coefficient is varied. When the scattering coefficients of the tuner 148 are so adjusted, it is understood that the magnitude of the energy reflected to the circulator circuit 144 from the unknown port 162 is independent of the phase of the reflected energy, which occurs when the energy the circulator circuit applies to the unknown port is independent of the phase of the unknown reflection cofficient. This in turn implies that the impedance looking into port 162 is matched to the desired reference impedance, and this satisfies the second condition.

By way of example, one such procedure for adjusting the tuner 148 is to connect a short-circuited transmission line of variable length, e.g. a line stretcher terminated with a short circuit, to the unknown port. The tuner 148 is then adjusted so that the output device indication of the magnitude of the detector port signal remains constant as the length of the short-circuited line is varied.

With the tuners set in this manner, the signal the circulator circuit 144 develops at the detector port 158 is exactly proportional in magnitude to the magnitude of the reflection coefficient presented to the unknown port 162. Further, the signal phase equals the reflection coefficient phase plus an ascertainable constant. Any error in the detector signal results exclusively from the inability of the circuit 144 to satisfy one or the other of the conditions at the given frequency through imperfect adjustment of one or both tuners.

Alternative to the arrangement shown in FIG. 7, the tuner 148 can be connected between the circulator 146 and the detector port 158. In either case, it is adjusted in the manner described above.

One advantage of the circulator circuit 144 in impedance and reflection coefficient measuring systems is that it produces an output signal of unusually large magnitude relative to the magnitude of the input signal from the source 152. In fact, the circuit 144 transfers to the detector port essentially all of the energy reflected from the unknown port, and the latter port receives essentially all the input signal.

More important, however, is that the circulator circuit 144 develops an output signal that accurately corresponds to the phase and magnitude of the reflection coefficient of the component 160. It is believed that it was heretofore unknown to construct three-port circuits, including nonreciprocal ones, to meet the second condition described above. In particular, it is understood that it has not been known to provide the second condition in a nonreciprocal circuit that meets also the first condition. Further, in the prior art, to develop a signal accurately corresponding in phase and magnitude to a reflection coefficient with a circulator was considered to require an ideal circulator, i.e. one having essentially perfect isolation, and a substantially perfectly matched source and a like output device. The FIG. 7 circuit 144, on the other hand, provides the desired operation with an imperfect circulator 146 and with a mismatched source and a mismatched output device.

Although described with reference to coaxial transmission line circuits, the invention is applicable to other constructions for radio frequency operation, including two-wire transmission lines and waveguide. The invention can even be applied to equipment wherein unguided radio waves are directed by antennas between a source, an output device and devices functioning as side arm terminations.

It will thus be seen that the objects set forth above, among those made apparent from the preceding description, are efficiently attained and, since certain changes may be made in the constructions set forth and in carrying out the above techniques without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A radio-frequency circuit comprising:
(A) conductor means forming a generator port, a detector port, and an unknown port, and
(B) lossy coupling means
   (1) forming signal paths for transferring radio frequency energy applied at said generator port to both said unknown port and said detector port with at least one resistive element connected in the path between said generator port and said detector port to receive energy applied to said generator port,
   (2) producing a voltage V at said detector port by way of said signal paths when a voltage (2E) is applied in series with a generator impedance to said generator port with the ratio of said voltage being $$\frac{V}{E} = \frac{(1-\Gamma_g)(1+\Gamma_d)S_{21}S_{32}\Gamma_x}{1-\Gamma_g S_{11} - \Gamma_d S_{33} + \Gamma_g \Gamma_d S_{11} S_{33}}$$

where:
   $\Gamma_x$ is the reflection coefficient said circuit presents to said unknown port;
   $\Gamma_g$ is the reflection coefficient the source of voltage (2E) presents to said generator port,
   $\Gamma_d$ is the reflection coefficient the output device receiving voltage V presents to said detector port, and
   $S_{ij}$ is a scattering coefficient of the circuit and equal to the ratio between the wave entering port $j$ and the wave leaving port $i$, with all other ports having matched terminations and where $i$ and $j$ are port-identifying integers numbered with the generator port being numbered (1), the unknown port being numbered (2) and the detector port being numbered (3).

2. A radio-frequency circuit comprising
(A) conductor means forming at least a generator port, a detector port and an unknown port, and
(B) coupling means
   (1) forming at least a first nonreciprocal signal path from said generator port to said unknown port, a second nonreciprocal signal path from said unknown port to said detector port, and a third nonreciprocal signal path from said detector port to said generator port,
   (2) producing a voltage V at said detector port by way of said signal paths when a voltage (2E) is applied in series with a generator impedance to said generator port with the ratio of said voltages being $$\frac{V}{E} = \frac{(1-\Gamma_g)(1+\Gamma_d)S_{21}S_{32}\Gamma_x}{1-\Gamma_g S_{11} - \Gamma_d S_{33} + \Gamma_g \Gamma_d S_{11} S_{33}}$$

where:
   $\Gamma_x$ is the reflection coefficient said circuit presents to said unknown port,
   $\Gamma_g$ is the reflection coefficient the source of of voltage (2E) presents to said generator port,
   $\Gamma_d$ is the reflection coefficient the output device receiving voltage V presents to said detector port, and
   $S_{ij}$ is a scattering coefficient of the circuit and equal to the ratio between the wave entering port $j$ and the wave leaving port $i$, with all other ports having matched terminations where $i$ and $j$ are port-identifying integers numbered with the generator port being numbered (1), the unknown port being numbered (2) and the detector port being numbered (3).

3. A radio-frequency circuit comprising
(A) conductor means forming a generator port, a detector port, and an unknown port, and
(B) coupling means
   (1) forming signal paths between said ports and including:
      (a) first radio frequency tuner means having two ends and connected at one end thereof to said unknown port,
      (b) second radio frequency tuner means having two ends and connected at one end thereof to one of said generator and detector ports and
      (c) a three-port circulator having a different port connected to each of
         (1) the other end of said first tuner means,
         (2) the other end of said second tuner means, and
         (3) the other of said generator and detector ports, and
   (2) producing a voltage V at said detector port by way of said signal paths when a voltage (2E) is applied in series with a generator impedance to said generator port with the ratio of said voltages being $$\frac{V}{E} = \frac{(1-\Gamma_g)(1+\Gamma_d)S_{21}S_{32}\Gamma_x}{1-\Gamma_g S_{11} - \Gamma_d S_{33} + \Gamma_g \Gamma_d S_{11} S_{33}}$$

where:
   $\Gamma_x$ is the reflection coefficient said circuit presents to said unknown port,
   $\Gamma_g$ is the reflection coefficient the source of voltage (2E) presents to said generator port,
   $\Gamma_d$ is the reflection coefficient the output device receiving voltage V presents to said detector port, and
   $S_{ij}$ is a scattering coefficient of the circuit and equal to the ratio between the wave entering port $j$ and the wave leaving port $i$, with all other ports having matched terminations and where $i$ and $j$ are port-identifying integers numbered with the generator port being numbered (1), the unknown port being numbered (2) and the detector port being numbered (3).

4. A radio-frequency circuit comprising
(A) conductor means forming a generator port, a detector port, and an unknown port and
(B) coupling means:
   (1) forming a first reciprocal signal path between said generator port and said detector port with said unknown port being coupled to said first path intermediate said generator and detector ports,
   (2) forming a second reciprocal signal path between said detector port and said generator port and having a resistive element therein, said second path being separate from and in parallel with said first path,
   (3) producing a voltage V at said detector port by way of said signal paths when a voltage (2E) is applied in series with a generator impedance to said generator port with the ratio of said voltages being:

$$\frac{V}{E} = \frac{(1-\Gamma_g)(1+\Gamma_d)S_{21}S_{32}\Gamma_x}{1-\Gamma_g S_{11} - \Gamma_d S_{33} + \Gamma_g \Gamma_d S_{11} S^2_{3}}$$

where:
   $\Gamma_x$ is the reflection coefficient said circuit presents to said unknown port,
   $\Gamma_g$ is the reflection coefficient the source of voltage (2E) presents to said generator port, $\Gamma_d$ is the reflection coefficient the output device receiving voltage V presents to said detector port, and $S_{ij}$ is a scattering coefficient of the circuit and equal to the ratio between the wave entering port $j$ and the wave leaving port $i$, with all other ports having matched terminations and where $i$ and $j$ are port-identifying integers numbered with the generator port being numbered (1), the unknown port being numbered (2) and the detector port being numbered (3).

5. A circuit according to claim 4 in which said paths include a transmission line connected between said generator and unknown ports, a transmission line connected between said unknown and detector ports and a transmission line connected between said detector and generator ports, each of said transmission lines being substantially matched at each end thereof to the impedance to which it is connected.

6. A circuit according to claim 4 further comprising conductor means forming a standard port coupled to said second path intermediate said generator and detector ports.

7. A circuit according to claim 4
(A) in which said coupling means forms said first and second parallel paths with first and second transmission lines respectively,
(B) in which each of said generator ports and said first and second transmission lines comprises a pair of transmission line conductors arranged to propogate energy in an unbalanced mode,
(C) in which said coupling means cross connects each generator port transmission line conductor to different conductors of said first and second transmission lines to deliver energy applied to said generator port to each of said first and second transmission lines with opposite phase,
(1) said cross-connection being applied at the ends of said first and second transmission lines adjacent said generator port.

8. A circuit according to claim 7 further comprising conductive means forming radio frequency cavity means coupled with said first and second transmission lines and arranged to maintain the impedance between said generator port conductors above a minimum value at least over a selected range of radio frequencies.

9. A circuit according to claim 8 further comprising a voltage source connected to said generator port and presenting a substantially zero source output impedance thereto.

10. A circuit according to claim 4
(A) in which said coupling means forms said two paths with first and second transmission lines each having first and second transmission line conductors arranged to conduct radio frequency energy in an unbalanced mode,
(1) said first conductor in each said transmission line being at a direct voltage reference potential, and
(B) in which said generator port comprises two transmission line conductors, one said generator port conductor being connected to said second conductor of said first transmission line, and the other being connected to said second conductor of said second transmission line.

11. A multiport radio frequency circuit comprising
(A) a radio frequency conductor means forming a generator port, an unknown port, and a detector port,
(B) a nonreciprocal circulator having fourth, fifth and sixth radio frequency ports,
(C) first and second radio frequency tuners,
(1) said first tuner being connected between said fifth circulator port and said unknown port and having such a scattering matrix that in response to a radio frequency signal applied to said generator port, said circuit produces a minimum signal at said detector port when the reflection coefficient presented to said unknown port has minimum magnitude,
(2) said second tuner:
(a) being connected between one of said detector and generator ports and one of said fourth and sixth circulator ports, and
(b) having such a scattering matrix that when a signal source and an output device are connected to said generator and detector ports respectively, said circuit develops a substantially matched input impedance at said unknown port at the radio frequency of said signal.

12. Radio frequency measuring equipment comprising:
(A) radio frequency conductor means forming a generator port, an unknown port and a detector port,
(B) a nonreciprocal radio frequency circulator having fourth, fifth and sixth ports,
(C) a first radio frequency tuner connected between said unknown port and said fifth circulator port,
(D) a second radio frequency tuner connected between one of said generator and detector ports and one of said fourth and sixth ports respectively,
(E) a source of radio frequency energy connected to said generator port,
(F) a radio frequency output device connected to said detector port and being responsive to at least one of the phase and magnitude of the radio frequency signal applied thereto,
(G) said circulator and tuners, at the same frequency
(1) applying to said measuring device a signal having minimum magnitude when the reflection coefficient presented to said unknown port has minimum value, and
(2) presenting to said unknown port a substantially matched impedance.

13. A transmission line circuit comprising:
(A) a generator port structure having plural conductors,
(B) a transmission line having first and second coupled conductors
(1) coextensive along a substantially closed path having first and second ends,
(2) connected at said path ends with said generator port conductors to receive at said two ends thereof, from said generator port structure, radio frequency signals of opposite phase,
(C) a detector port having third and fourth coupled conductors connected to said first and second conductors respectively midway around said path between said ends thereof so that said path has two branches of essentially equal electrical length interconnecting said generator port structure and said detector port,
(D) an unknown port having fifth and sixth coupled conductors connected to said first and second conductors respectively in a first of said branches intermediate said generator port structure and said detector port,
(E) lossy means in said transmission line consisting at least of a resistive element connected in said second branch,
(F) said lossy transmission line and said detector port and said unknown port providing at the same radio frequency
(1) a minimum signal at said detector port in response to a signal applied to said generator port structure when the magnitude of the reflection coefficient at said unknown port has a minimum value, and
(2) matched input impedance at said unknown port when matched terminations are connected to said generator port structure and to said detector port.

14. A transmission line according to claim 13 further comprising a standard port having seventh and eighth coupled conductors connected to said first and second conductors respectively in the second of said branches intermediate said detector port and said generator port structure.

15. A circuit according to claim 14 in which the electrical length of said first branch between said unknown port and said detector port is essentially equal to the electrical length of said second branch between said standard and detector ports.

16. A transmission line circuit according to claim 13 in which said second transmission line conductor is connected at said first path end to one generator port conductor and at said second path end to another generator port conductor, and in which said first conductor is connected at said first path end to said other generator port conductor and at said second path end to said one generator port conductor.

17. A transmission line circuit according to claim 16 further comprising circuit means coupled with said generator port conductors and arranged to maintain the impedance between them above a selected value over at least a selected frequency range.

18. A transmission line circuit according to claim 17 further comprising a source applying leveled radio frequency energy to said generator port conductors.

19. A transmission line circuit according to claim 16 in which said generator port structure comprises two pairs of transmission line conductors, one pair of which includes said one generator port conductor and the other pair of which includes said other generator port conductor, the remaining two generator port conductors being connected at different ends of said path to said first conductor.

20. A transmission line circuit according to claim 13 in which said second transmission line conductor has series resistance elements therein between each of said ports.

21. A transmission line circuit according to claim 20
(A) further comprising a shunt resistance element connected between said first and second conductors in said second transmission line branch, and
(B) in which said second conductor has series resistance elements therein between said shunt element and each of said generator and detector ports.

22. A transmission line circuit according to claim 14 in which said second transmission line conductor has series resistance elements, therein intermediate at least said unknown and detector ports and said detector and standard ports.

23. A radio frequency circuit comprising
(A) conductor means forming a generator port having first and second generator port conductors, a detector port, an unknown port and a standard port, and
(B) transmission line means
  (1) interconnecting said ports and forming reciprocal radio frequency signal paths between said first generator port conductor and said unknown port, between said unknown and detector ports, between said detector and standard ports, and between said standard port and said second generator port conductor,
  (2) having resistive elements connected in at least said paths that connect to said detector port, and
  (3) so arranged that in response to a voltage (2E) applied at said generator port between conductors thereof, said circuit produces a voltage V at said detector port by way of said signal paths, such that $(V/E)$ has the following value $$\frac{V}{E} = \frac{(1-\Gamma_g)(1+\Gamma_d)S_{12}S_{23}(\Gamma_x-\Gamma_s)}{1-\Gamma_g S_{11}-\Gamma_d S_{33}+\Gamma_g\Gamma_d S_{11}S_{33}+\Gamma_x\Gamma_s\{-S_{24}{}^2+\Gamma_g(S_{11}S_{24}{}^2+S_{12}{}^2S_{22}\mp 2S_{12}{}^2S_{24})+\Gamma_d(S_{24}{}^2S_{33}+S_{22}S_{23}{}^2\pm 2S_{23}{}^2S_{24})+\Gamma_g\Gamma_d(4S_{12}{}^2S_{23}{}^2-S_{12}{}^2S_{22}S_{33}-S_{11}S_{22}S_{23}{}^2-S_{11}S_{24}{}^2S_{33}\pm 2S_{12}{}^2S_{24}S_{33}\mp 2S_{11}S_{23}{}^2S_{24})\}}$$

where:
  $i$ and $j$ are integers 1, 2, 3, or 4 identifying the same-numbered port, with said generator, unknown, detector and standard ports being numbered 1, 2, 3, and 4, respectively;
  $a_i$ is the wave entering port $i$;
  $b_i$ is the wave leaving port $i$;
  $S_{ij}$ is a scattering coefficient of the circuit, specifically it is the ratio of waves $b_i$ and $a_j$ ($S_{ij}=b_i/a_j$) with all other ports having matched terminations;
  $\Gamma_x$ is the reflection coefficient the external termination presents to the unknown port;
  $\Gamma_g$ is the reflection coefficient the source presents to the generator port;
  $\Gamma_d$ is the reflection coefficient the output device presents to the detector port;
  $\Gamma_s$ is the reflection coefficient the external termination presents to the standard port; and
  $\Gamma_i$ is the reflection coefficient looking into port $i$.

24. A transmission line bridge circuit comprising
(A) first, second, third and fourth transmission line arms successively connected in series,
(B) conductor means forming a first transmission line port structure and second, third, and fourth transmission line ports
  (1) said second, third and fourth ports being connected respectively to the interconnected ends of said first and second arms, of said second and third arms and of said third and fourth arms,
  (2) the other ends of said first and fourth arms being connected with said first port structure for receiving from said first port structure radio frequency signals that are out of phase from each other at said other ends of said first and fourth arms,
(C) each of said second and third arms comprising series resistance elements,
(D) said first and second arms and said third and fourth arms forming parallel signal paths between said first port structure and said third port,
(E) said second and third arms having electrical lengths, characteristic impedances and arrangements of resistance elements that are substantially identical,
(F) said first and fourth arms having electrical lengths and characteristic impedances that are substantially identical and
(G) said conductor means and said transmission line arms providing said circuit with a transfer function $$\frac{V}{E} = \frac{(1-\Gamma_g)(1+\Gamma_d)S_{12}S_{23}(\Gamma_x-\Gamma_s)}{N+\Gamma_x\Gamma_s M}$$

where:
  V is the output voltage of the circuit at the detector port;
  2E is the Thevenin-equivalent source voltage applied to the detector port;
  N and M are quantities that depend only on the scattering coefficients and on $\Gamma_g$ and $\Gamma_d$ and are independent of $\Gamma_x$ and $\Gamma_s$;
  $i$ and $j$ are integers 1, 2, 3, or 4 identifying the same-numbered port, with said generator, unknown, detector and standard ports being numbered 1, 2, 3, and 4, respectively;

$a_i$ is the wave entering port $i$;
$b_i$ is the wave leaving port $i$;
$S_{ij}$ is a scattering coefficient of the circuit, specifically it is the ratio of waves $b_i$ and $a_j$, ($S_{ij}=b_i/a_j$) with all other ports having matched terminations;
$\Gamma_x$ is the reflection coefficient the external termination presents to the unknown port;
$\Gamma_g$ is the reflection coefficient the source presents to the generator port;
$\Gamma_d$ is the reflection the output device presents to the detector port;
$\Gamma_s$ is the reflection coefficient the external termination presents to the standard port; and
$\Gamma_i$ is the reflection coefficient looking into port $i$.

25. A lossy radio frequency circuit comprising:
(A) first, second, third and fourth transmission lines connected in series succession between one end of said first transmission line and one end of said fourth transmission line, with the combined electrical length of said first and second transmission lines being equal to the combined electrical length of said third and fourth transmission lines,
(B) at least second and third transmission line ports connected respectively to the interconnection of said first and second transmission lines and to the interconnection of said second and third transmission lines,
(C) resistive means connected in the transmission line signal path between said third port and said one end of said fourth lines,
(D) transmission line means for applying equal magnitude and opposite phase radio frequency signals to said one end of said first and fourth transmission lines, and
(E) said transmission lines and said transmission line ports
  (1) responding to said signals applied to said first and fourth transmission lines to develop a null signal at said third port when a matched impedance is connected to said second port, and
  (2) presenting an essentially zero reflection coefficient to said second port when matched impedances are connected to said ends of said first and fourth transmission lines and to said third transmission line port.

26. A transmission line circuit according to claim 25:
(A) further comprising a radio frequency source connected to said signal applying means and operable to cause said means to apply equal magnitude and opposite phase radio frequency signals to said ends of said first and fourth transmission lines, and
(B) output means responsive to the phase and magnitude of the radio frequency signal applied thereto connected to said third transmission line port.

27. Radio frequency apparatus comprising:
(A) radio frequency detector means,
(B) radio frequency source means, and
(C) nonreciprocal radio frequency circular means:
  (1) having radio frequency conductor means forming a generator port, an unknown port, and a detector port, and having said generator port and said detector port connected respectively to said source means and to said detector means,
  (2) having a first nonreciprocal signal path from said generator port to said unknown port, having a second nonreciprocal signal path from said unknown port to said detector port, and having a third nonreciprocal signal path from said detector port to said generator port,
  (3) responding to a radio frequency signal output from said source means to said generator port to produce at said detector port a signal having a null value when the reflection coefficient presented to said unknown port has minimum value, and
  (4) presenting a matched input impedance at said unknown port at the frequency of said signal.

28. A transmission line circuit as defined in claim 25 further comprising resistive elements in at least each of said second and third transmission lines adjacent both ends thereof.

29. A transmission line circuit as defined in claim 28 comprising a further resistive element connected with the interconnection of said second and third transmission lines as one of:
  (1) a shunt resistive element at said interconnection, and
  (2) a series resistive element connected to said interconnection in series with said third port.

30. A transmission line circuit according to claim 28
(A) further comprising a fourth transmission line port connected to the interconnection of said third and fourth transmission lines, and
(B) in which the electrical length of said second transmission line is equal to the electrical length of said third transmission line.

31. A transmission line circuit according to claim 30 in which each of said second and fourth ports comprises a transmission line having a resistive element in series therein adjacent the connection to said interconnection of said series-connected transmission lines.

References Cited

UNITED STATES PATENTS

| | | |
|---|---|---|
| 2,147,809 | 2/1939 | Alford. |
| 2,288,030 | 6/1942 | Salinger. |
| 2,416,790 | 3/1947 | Barrow. |
| 2,473,328 | 6/1949 | Brown et al. |
| 2,547,802 | 4/1951 | Woodward. |
| 2,736,864 | 2/1956 | Sinclair et al. |
| 3,090,003 | 5/1963 | Rempel et al. |
| 3,257,614 | 6/1966 | Hankin et al. |
| 3,271,668 | 9/1966 | Haake et al. |
| 3,309,608 | 3/1967 | Alford. |

EDWARD E. KUBASIEWICZ, Primary Examiner

U.S. Cl. X.R.

333—11

UNITED STATES PATENT OFFICE
CERTIFICATE OF CORRECTION

Patent No. 3,522,526              Dated August 4, 1970

Inventor(s) Albert E. Sanderson

It is certified that error appears in the above-identified patent and that said Letters Patent are hereby corrected as shown below:

Column 2, line 25, change "other" to --others--.

Column 2, line 38, change "trerminating" to --terminating--.

Column 3, at the end of line 27 add --called--.

Column 4, line 71 change "$S_{jj}$" to --$S_{ij}$--.

Column 8, line 5, change "condnuctors" to --conductors--.

Column 11, delete the comma between lines 15 and 16.

Column 12, line 14 is incorrectly placed. It should be inserted between lines 19 and 20.

Column 13, line 6, change "standrad" to --standard--.

Column 13, line 69, change "uee" to --use--.

Column 17, line 60, delete "of".

In claim 4, column 18, in the equation, change "$S^2_3$" to --$S_{33}$--.

PO-1050
(5/69)

UNITED STATES PATENT OFFICE
CERTIFICATE OF CORRECTION

Patent No. 3,522,526      Dated August 4, 1970

Inventor(s) Albert E. Sanderson

It is certified that error appears in the above-identified patent and that said Letters Patent are hereby corrected as shown below:

Column 22, line 17, change "$a_i$" to --$a_j$--.

Column 22, line 18, change "$b_j$" to --$b_i$--.

Column 23, line 4, change "$a_i$" to --$a_j$--.

PO-1050
(5/69)

UNITED STATES PATENT OFFICE
CERTIFICATE OF CORRECTION

Patent No. 3,522,526      Dated August 4, 1970

Inventor(s) Albert E. Sanderson      Page 3

It is certified that error appears in the above-identified patent and that said Letters Patent are hereby corrected as shown below:

Column 2, line 23, change "heerinafter" to --hereinafter--.

Column 4, line 71, "$S_{jj}$" should be changed to --$S_{ij}$--. Same line, change "specially" to --specifically--.

Equation 7, column 5, lines 55 and 56, change "$\Delta$" to --$\Delta'$--.

On Sheet 3 of the drawings, in Figure 4, change the uppermost numeral on the vertical scale of RESISTANCE (OHMS) AND FIGURE OF MERIT from "000" to --1000--.

SIGNED AND SEALED
NOV 17 1970

(SEAL)
Attest:

Edward M. Fletcher, Jr.
Attesting Officer

WILLIAM E. SCHUYLER, JR.
Commissioner of Patents